(12) United States Patent
Guwang

(10) Patent No.: US 9,219,430 B2
(45) Date of Patent: Dec. 22, 2015

(54) SENSOR COMPRISING A PIEZOELECTRIC DETECTOR WITH COMPENSATION FOR GROUND FAULTS

(75) Inventor: Marcel Guwang, Lacroix-Falgarde (FR)

(73) Assignee: HIDRIA AET DRUZBA ZA PROIZVODNJO VZIGNIH SISTEMOV IN ELEKTRONIKE D.O.O., Tolmin (SI)

( * ) Notice: Subject to any disclaimer, the term of this patent is extended or adjusted under 35 U.S.C. 154(b) by 367 days.

(21) Appl. No.: 13/994,895

(22) PCT Filed: Dec. 20, 2011

(86) PCT No.: PCT/EP2011/073449
§ 371 (c)(1),
(2), (4) Date: Jun. 17, 2013

(87) PCT Pub. No.: WO2012/084982
PCT Pub. Date: Jun. 28, 2012

(65) Prior Publication Data
US 2013/0270964 A1 Oct. 17, 2013

(30) Foreign Application Priority Data
Dec. 21, 2010 (FR) .................................... 10 04998

(51) Int. Cl.
 *H02N 2/18* (2006.01)
 *G01D 1/02* (2006.01)
 *G01D 3/036* (2006.01)

(52) U.S. Cl.
 CPC ............... *H02N 2/181* (2013.01); *G01D 1/02* (2013.01); *G01D 3/036* (2013.01)

(58) Field of Classification Search
 CPC ......... H02N 2/181; G01D 1/02; G01D 3/036; H01L 41/044

USPC .................................................. 310/318, 319
See application file for complete search history.

(56) References Cited

U.S. PATENT DOCUMENTS

| | | | | |
|---|---|---|---|---|
| 6,246,152 | B1 * | 6/2001 | Fontanella et al. | 310/317 |
| 6,407,631 | B2 * | 6/2002 | Yamashita | 330/69 |
| 6,714,070 | B1 * | 3/2004 | Smith | 330/69 |
| 8,030,915 | B2 | 10/2011 | Suquet | |
| 2004/0183398 | A1 * | 9/2004 | Kashiwase et al. | 310/319 |
| 2007/0063617 | A1 * | 3/2007 | Yamashita | 310/318 |
| 2010/0321002 | A1 * | 12/2010 | Suquet | 324/123 R |

FOREIGN PATENT DOCUMENTS

FR    2 910 958    7/2008

OTHER PUBLICATIONS

International Search Report dated Apr. 24, 2012, corresponding to PCT/EP2011/073449.

* cited by examiner

*Primary Examiner* — Shawki S Ismail
*Assistant Examiner* — Bryan Gordon
(74) *Attorney, Agent, or Firm* — Young & Thompson

(57) ABSTRACT

A sensor includes a piezoelectric detector (10) mounted in a support having electrically conductive walls forming a mechanical ground (MM), and an amplifier for processing the signal delivered by the piezoelectric detector, defining an electronic ground (ME) and at least a capacitive feedback loop (16). A voltage adder circuit (61) is inserted into the capacitive feedback loop in order to add an electrical voltage which varies as a function of the potential difference between the mechanical ground (MM) and the electronic ground (ME), so that the variations of this potential difference are continuously compensated for at the input (13) of the processing amplifier (12) receiving the signal delivered by the piezoelectric detector (10).

15 Claims, 4 Drawing Sheets

SENSOR COMPRISING A PIEZOELECTRIC DETECTOR WITH COMPENSATION FOR GROUND FAULTS

Figure 1:
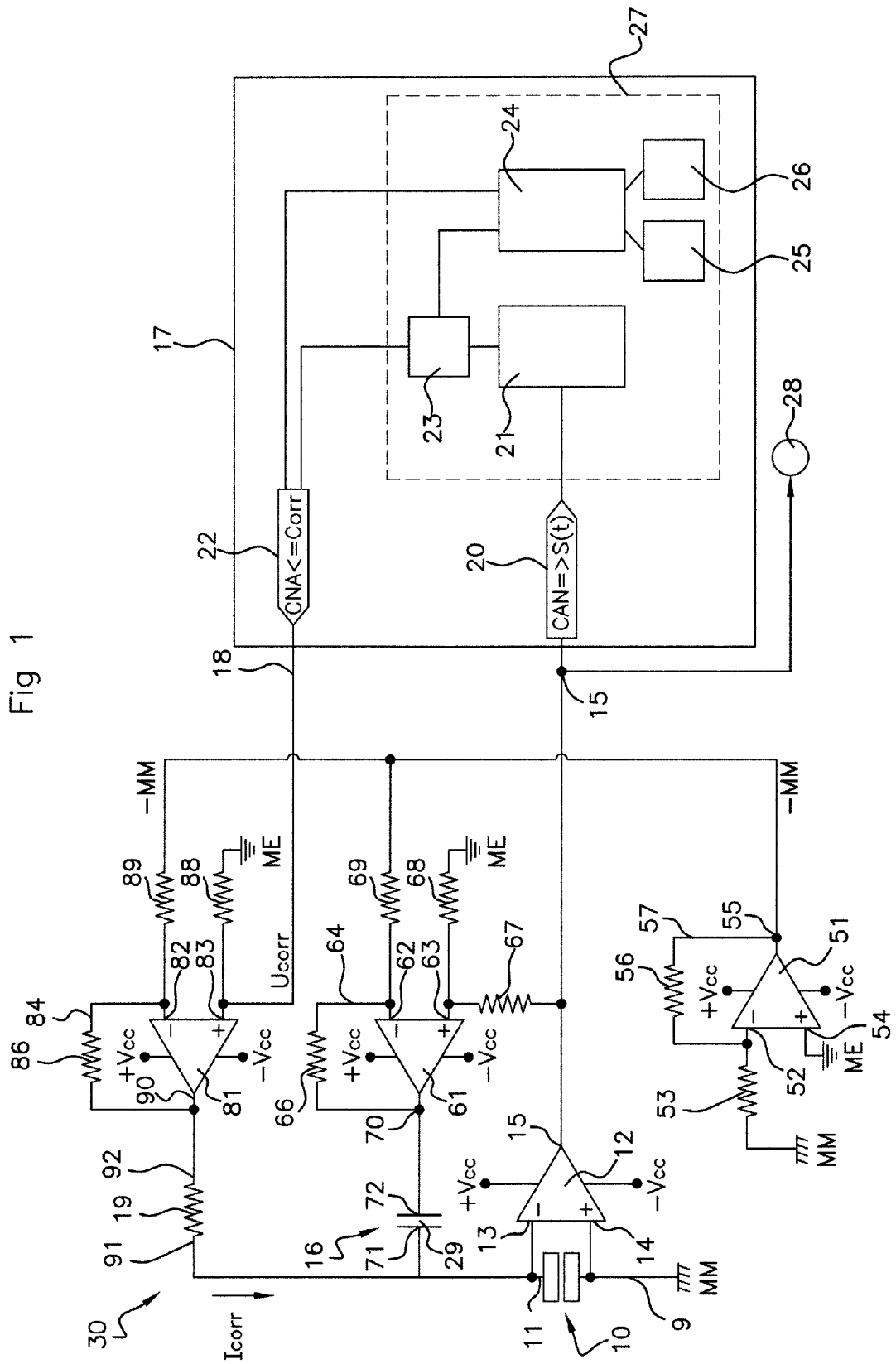

The invention relates to a sensor comprising a piezoelectric detector mounted in a support having electrically conductive walls forming a first electrical potential reference, referred to as mechanical ground, to which the piezoelectric detector is connected, and an electronic circuit for processing the signal delivered by the piezoelectric detector, this processing circuit delivering a voltage signal representative of the signal delivered by the detector, and comprising an electrical supply circuit providing a second potential reference, referred to as electronic ground.

In various applications, a piezoelectric detector has to be installed in an electrically perturbed environment. Such is the case, for example, of a piezoelectric detector integrated in a diesel engine glow plug, making it possible to measure the pressure in a cylinder of the engine.

The signal delivered by the detector and the processing carried out by the processing circuit must make it possible to provide a signal representative of the physical quantity measured by the piezoelectric detector, while not being perturbed by high-intensity currents induced, for example, by the electrical starter of the engine.

FR 2910958 aims to propose a sensor which provides signals while avoiding capacitive coupling and the need for electromagnetic shielding. To this end, it describes an integrated sensor comprising a voltage regulator which is electrically coupled to the mechanical ground and delivers a regulated voltage on the basis of a primary supply voltage referenced with respect to the electronic ground, the charge amplifier being supplied with the regulated voltage via a divider bridge.

This solution has the drawback of inducing a potential difference between the two input terminals of the piezoelectric detector, which increases the leakage currents. Furthermore, when this circuit is produced in the form of an integrated circuit, a large proportion of the components are connected to the mechanical ground, which leads to risks of electrostatic discharges and parasitic electrical effects. As this document itself moreover indicates, it is necessary to provide expensive specific means of protection. Furthermore, in practice, manufacture of the integrated circuit is much more intricate and therefore expensive.

It is consequently an object of the invention to overcome these drawbacks by providing a sensor in which the potential differences between the mechanical ground and the electronic ground are compensated for automatically without causing an increase in the risks of leakage currents at the input, and while allowing simple, inexpensive and reliable standard manufacture in the form of an integrated circuit, without the risk of parasitic electrical effects or electrostatic discharges (ESD).

It is also an object of the invention to provide such a sensor in which this compensation is obtained throughout the entire passband of the detector.

To this end, the invention relates to a sensor comprising a piezoelectric detector mounted in a support having electrically conductive walls forming a first electrical potential reference, referred to as mechanical ground, to which the piezoelectric detector is connected, and a circuit for processing the signal delivered by the piezoelectric detector, said processing circuit comprising:
- an electrical supply circuit defining a second potential reference, referred to as electronic ground,
- a charge amplifier comprising an operational amplifier, referred to as a processing amplifier, having:
    - an input connected to an output of the piezoelectric detector so as to receive the signal delivered by this output of the piezoelectric detector,
    - an output delivering an output voltage signal referenced with respect to the electronic ground and representative of the signal delivered by the piezoelectric detector,
    - a capacitive feedback loop between the output and the input of the processing amplifier receiving the signal delivered by the piezoelectric detector, said capacitive feedback loop comprising a capacitor of which a first terminal is connected to said input of the processing amplifier receiving the signal delivered by the piezoelectric detector,
    wherein the capacitive feedback loop comprises, between said output of the processing amplifier and said capacitor, a voltage adder circuit adapted to add on the second terminal of said capacitor an electrical voltage which varies as a function of the potential difference between the mechanical ground and the electronic ground, so that the variations of this potential difference are continuously compensated for at the input of the processing amplifier receiving the signal delivered by the piezoelectric detector.

In this way, only the piezoelectric detector and a very limited number of components of the processing circuit are electrically supplied with respect to the mechanical ground. This allows standard manufacture without the risk of electrostatic discharges or parasitic electrical effects.

The correction induced by injecting the potential difference between the mechanical ground and the electronic ground is manifested at the input of the processing circuit by a conjugate variation of the potential in the feedback loop at the input of the processing circuit.

Advantageously and according to the invention, said voltage adder circuit of the capacitive feedback loop comprises a first input connected to the mechanical ground so as to have an electrical potential dependent on the mechanical ground, a second input connected to the electronic ground so as to have an electrical potential dependent on the electronic ground, and an output which is connected to the second terminal of said capacitor and whose electrical potential is dependent on the potential difference between its two inputs. Furthermore, advantageously and according to the invention, one of the inputs of said voltage adder circuit of the capacitive feedback loop is connected to the output of the processing amplifier so that the electrical potential on said input also depends on the value of the electrical potential of this output.

Advantageously, in one embodiment and according to the invention, said voltage adder circuit of the capacitive feedback loop comprises an operational amplifier, referred to as a processing amplifier, having:
- an inverting input connected to a terminal having an opposite electrical potential to the mechanical ground,
- a noninverting input connected to the electronic ground and to said output of the processing amplifier,
- an output connected to said second terminal of the capacitor of the capacitive feedback loop,
- and a negative feedback between the inverting input and the output of this adder amplifier.

A sensor according to this embodiment of the invention is also advantageously one wherein the output of the processing amplifier is connected to the noninverting input of the adder amplifier via a series resistor, wherein the electronic ground is connected to this noninverting input of the adder amplifier via a series resistor with the same value, wherein the opposite electrical potential to the mechanical ground is connected to the inverting input of the adder amplifier via a series resistor with the same value, and wherein the negative feedback of the adder amplifier contains a series resistor with the same value. The assembly constitutes said voltage adder circuit of the capacitive feedback loop.

Furthermore, a sensor according to the invention is also advantageously one wherein the processing circuit comprises a resistive feedback loop comprising a resistor, referred to as an injection resistor, a first terminal of which is connected in parallel with said output of the piezoelectric detector. Advantageously and according to the invention, the second terminal of the injection resistor is connected to a voltage adder circuit adapted to add on this second terminal of said injection resistor an electrical voltage which varies as a function of the potential difference between the mechanical ground and the electronic ground, so that the variations of this potential difference are continuously compensated for at the first terminal of the injection resistor. This voltage adder circuit of the resistive feedback loop may be the same as the voltage adder circuit of the capacitive feedback loop, the injection resistor simply being connected in parallel with the capacitor of the capacitive feedback loop, at the output of the same voltage adder circuit. As a variant, however, the voltage adder circuit of the resistive feedback loop may be separate from the voltage adder circuit of the capacitive feedback loop.

The invention is also compatible with a sensor comprising a compensation circuit, in particular of the type which forms slaving of the output of the processing amplifier with respect to a reference voltage value, and which makes it possible to compensate for the drifts of the DC component, such as those induced by the pyroelectric effect. Thus, advantageously and according to the invention, the processing circuit comprises a compensation circuit comprising an input connected to said output of the processing amplifier, and an output delivering a compensation voltage signal which is applied to said second terminal of the injection resistor via a voltage adder circuit separate from said voltage adder circuit of the capacitive feedback loop.

Furthermore, advantageously and according to the invention, the processing amplifier is supplied in bipolar fashion by supply voltages +Vcc, −Vcc which have opposite values with respect to the electronic ground and are selected so as to permit the variations of the potential of the mechanical ground with respect to that of the electronic ground (that is to say they are selected as a function of the expected range of the variations between these grounds).

In this way, the processing amplifier can accept without difficulty (in particular without risk of saturation) the entire range of variations of the mechanical ground with respect to the electronic ground, on the basis of which it is thus supplied in bipolar fashion. And with the sensor according to the invention comprising, for the capacitive feedback loop of the processing amplifier, a voltage adder which injects into the loop the potential difference between the mechanical ground MM and the electronic ground ME, all the possible variations of the mechanical ground MM are automatically and continuously compensated for, without affecting the time constant of the capacitive feedback loop.

Preferably, advantageously and according to the invention, each operational amplifier of the processing circuit is supplied in bipolar fashion by supply voltages +Vcc, −Vcc which have opposite values with respect to the electronic ground and are selected so as to permit the variations of the potential of the mechanical ground with respect to that of the electronic ground (that is to say they are selected as a function of the expected range of the variations between these grounds).

The invention also relates to a sensor characterized in combination by all or some of the characteristics mentioned above or below.

Figure 2:
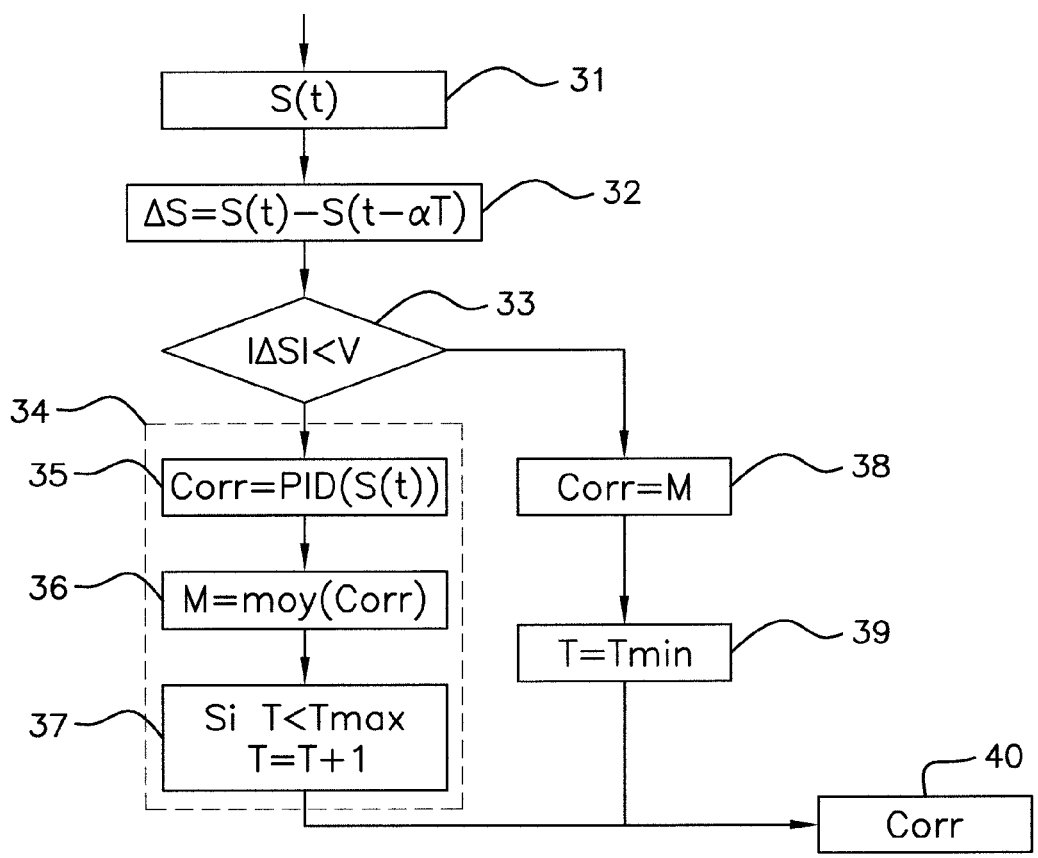
Figure 3A:
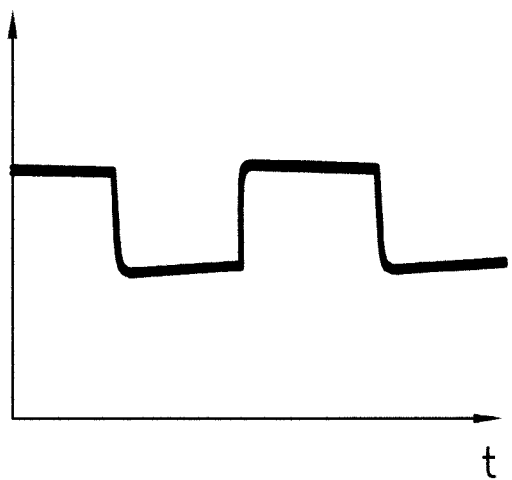
Figure 3B:
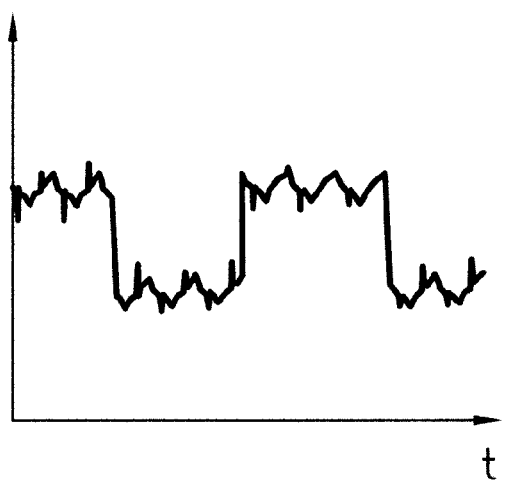
Figure 3C:
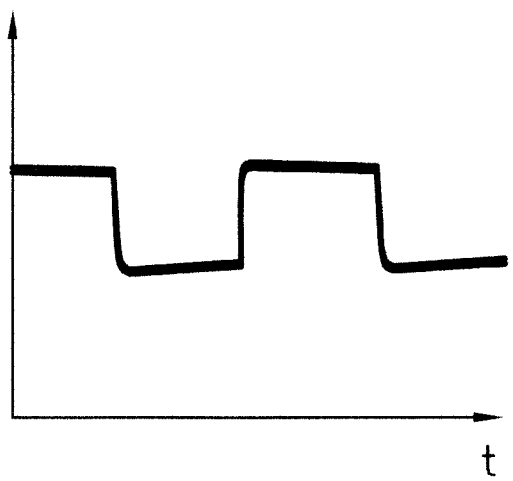
Figure 4:
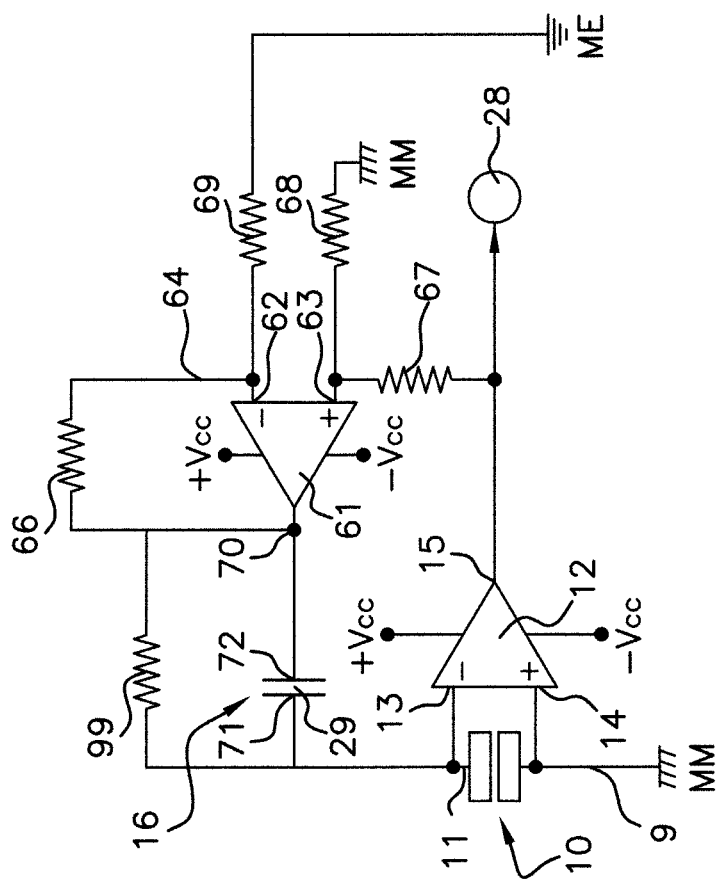

Other objects, characteristics and advantages of the invention will become apparent on reading the following description, which refers to the appended figures that represent preferred embodiments of the invention by way of nonlimiting examples and in which:

FIG. 1 is a circuit diagram of a sensor according to a first embodiment of the invention, FIG. 2 is a flow chart of an embodiment of a compensation method which may be employed in a processing circuit of a sensor according to the invention, FIGS. 3a, 3b, 3c are examples of graphs illustrating the effect of the invention, FIG. 4 is a block diagram of a sensor according to a second embodiment of the invention.

The sensor according to the invention, represented in FIG. 1, comprises a piezoelectric detector 10 which, on a first terminal 11, delivers a signal (formed by electrical charges) that is processed by a processing circuit comprising, in the first embodiment as represented in FIG. 1, a charge amplifier comprising an inverting operational amplifier, referred to as a processing amplifier 12, with a high gain and a capacitive feedback 16, comprising in the example a capacitor 29 with a capacitance C.

The first terminal 11 of the detector 10 is connected to the inverting input 13 of the processing amplifier 12, the noninverting input 14 of which, as well as a second terminal 9 of the detector 10, is connected to a first electrical potential reference referred to as mechanical ground MM. The output 15 of the processing amplifier delivers a voltage proportional to the charge produced by the detector 10. The capacitive branch 16 is connected in parallel between the output 15 and the inverting input 13 of the processing amplifier 12 receiving the signal of the detector 10. It therefore constitutes a capacitive feedback loop of the processing circuit.

The piezoelectric detector 10 makes it possible, for example, to measure the pressure prevailing in the chamber of a cylinder of a machine with one or more pistons, such as a heat engine. It is, for example, integrated in a glow plug of a diesel engine. It provides a signal representative of this cylinder pressure, the signal being in the form of relatively short pulses corresponding to the normal rapid variation phases of the cylinder pressure, resulting from the displacement of the piston and/or the combustion, these pulses being separated by plateaus of longer duration corresponding to at least substantially constant values of the cylinder pressure. The mechanical ground MM is then formed by the metal parts of the engine and of the glow plug, which are themselves connected to the ground of the battery of the vehicle.

The circuit for processing the signal delivered by the detector 10 also comprises an electrical supply circuit (not shown), for example in the form of a traditional stabilized supply integrated with a control unit of the engine (often referred to as an ECU), which is itself supplied from the battery of the vehicle. This stabilized supply defines a second electrical potential reference, referred to as electronic ground ME, which is independent of the variations of the mechanical ground MM, this electronic ground ME corresponding to the ground of the circuit board(s) holding the various electronic components of the sensor. The electrical supply circuit also provides voltages of positive and negative polarity +Vcc and −Vcc, respectively.

It should be noted that, depending on the applications and the constraints, the processing operational amplifier 12 may be the subject of various alternative embodiments, and in particular may be produced with architectures of greater or lesser complexity.

In the first embodiment, represented in FIG. 1, the processing circuit furthermore comprises a compensation circuit 17 which is integrated with a resistive feedback loop 30 and forms closed-loop slaving. This compensation circuit 17 receives the output (voltage) signal of the output 15 of the processing amplifier 12. The compensation circuit 17 provides a correction voltage signal Ucorr on an output 18 intended to be applied to a terminal 92 of a series resistor 19 of the loop 30, the other terminal 91 of which is connected to the input 13 of the processing amplifier 12 receiving the signal delivered by the detector 10. The resistor 19, with a value R0, converts the correction voltage signal Ucorr into an correction intensity signal, that is to say into a compensation current Icorr which is added to the signal delivered by the detector 10 and makes it possible to compensate for its untimely variations in absolute value.

The voltage signal provided by the processing amplifier 12 on the output 15 is thus compensated for and delivered on an output 28 of the processing circuit, allowing it to be utilized by connection to other external systems, for example operational management electronics of the machine.

FIG. 1 represents an example of an embodiment of this compensation circuit 17, although the invention is applicable and compatible with any other embodiment of this compensation circuit, or even in the absence of any compensation circuit, that is to say with a processing circuit consisting of a simple charge amplifier.

In the example represented, the compensation circuit 17 comprises an analog/digital converter 20 which delivers a digital signal S corresponding to the analog voltage of the output 15 of the processing amplifier 12.

This digital signal S is supplied on an input of an integrated circuit 27 (which may be formed by an ASIC, and FPGA, or a microcontroller or the like), comprising a circular buffer memory 21 successively storing the sampled measurements S(t) of the signal S according to a sampling clock frequency delivered by a clock 23 of the circuit 27. The integrated circuit 27 also comprises at least one microprocessor 24, at least one read only memory 25, and at least one random access memory 26 associated with this microprocessor. The microprocessor 24 carries out the processing method according to the invention on each sampled value of the signal S, as represented in FIG. 2. At the output of the integrated circuit 27, the microprocessor 24 delivers a digital correction signal Corr which is provided to a digital/analog converter 22 delivering an analog correction voltage signal Ucorr on the output 18 of the compensation circuit 17.

An example of the method for processing the signal S, carried out by the compensation circuit 17 at each iteration, that is to say each time the output signal is sampled, is represented in FIG. 2.

During the first step 31, the current value S(t) of the signal S is stored on a sampling clock edge, in the location of the circular buffer 21 activated by this clock edge.

During the second step 32, the variation ΔS of the output signal S is calculated between the current value S(t) at the instant t of the clock edge and one of the prior values of the signal S, referred to as S(t-αT), stored in the circular buffer 21 for a clock edge closest to the value t-αT, T being a natural whole number and a being a rational number between 0 and 1. For example, a is selected between 0.05 and 0.5, in particular of the order of 0.2. αT represents the duration over which the variation ΔS is calculated, which is therefore a fraction of a total duration represented by T, the value of which lies between a nonzero minimum value Tmin and a maximum value Tmax. These values are selected as a function of the maximum and minimum speeds of the machine, respectively. Thus, Tmin is less than the duration of the plateaus for the maximum engine speed and Tmax is greater than the duration of the plateaus for the minimum engine speed.

During the third step 33, the absolute value |ΔS| of this variation is compared with a predetermined comparison value V stored in the memory 25. In practice, this comparison value may be adjusted on the basis of the intrinsic noise contained in the signal during the plateaus, by fixing it at a value higher than the maximum value of the derivative of this intrinsic noise.

If the absolute value |ΔS| of the variation of the output signal is less than the comparison value V, this means that the signal delivered by the detector 10 corresponds to a plateau of the cylinder pressure, and slaving 34 is activated.

This slaving 34 consists, in a first step 35, in calculating a value of the correction signal Corr which makes it possible to slave the output signal S to the predetermined reference value Sr, independently of possible untimely variations of the absolute value of the signal delivered by the detector 10. This reference value Sr constitutes a setpoint of the slaving 34, and it may be selected and stored in memory 25 as a function of the constraints of the electronic circuits which are located downstream of the processing circuit according to the invention and receive the output signal.

This step of calculating the value of the correction signal Corr may be the subject of various alternative embodiments. Preferably, advantageously and according to the invention, this calculation is carried out by a PID regulator (proportional integral derivative) which receives the current value S(t) at its input, calculates the error with respect to the reference value Sr and applies regulation of the PID type to this error. It should be noted that the correction signal Corr is a digital voltage signal.

During the subsequent step 36 of the slaving 34, the current value of the correction signal Corr is stored and an average M of this correction signal Corr is calculated over the current value and various previously stored values of this correction signal Corr.

This average is preferably an algebraic mean calculated over a certain number of preceding samples. For example, at each iteration, this average is calculated over the βT preceding samples, β being a rational number between 0 and 1, for example of the order of 0.5, selected in order to filter the slight variations of the signal during the plateaus.

During the subsequent step 37 of the slaving 34, T is incremented by one unit and the duration αT used for calculating the variation ΔS is increased by α, unless the current duration is equal to a predetermined maximum duration αTmax. Tmax corresponds for example to the greatest possible duration of the plateaus, that is to say, in particular when the machine is an engine, to the duration of the plateaus at slow speed of the engine. To this end, if this value Tmax has not been reached, the value of T is incremented by one unit at each iteration for which the slaving has been activated, that is to say after each calculation of a value of the correction signal Corr. Thus, the duration is an increasing function of the number of previous sampling instants for which the absolute value |ΔS| of the variation has remained less than said predetermined comparison value, that is to say for which the signal delivered by the detector corresponds to the same plateau. In other words, the calculation duration of the variation of the output signal increases so long as the signal delivered by the detector 10 remains on the same pressure plateau. In this way, the detection sensitivity of the plateaus is independent of the speed of the machine.

It should be noted that the number $\beta T$ of previous samples used for calculating the average M is also increased at each iteration by incrementation of T, so long as the signal delivered by the detector 10 remains on the same pressure plateau.

If the comparison step 33 determines that the absolute value $|\Delta S|$ of the variation of the output signal is not less than the comparison value V, this means that the signal delivered by the detector 10 corresponds to a cylinder pressure peak, and the slaving 34 is deactivated. In this case, the correction signal Corr is fixed during step 38 at the last recorded value of the average M calculated the last time step 36 of the slaving 34 was carried out.

During the subsequent step 39, the value of T is reinitialized at a nonzero minimum initial value Tmin. Tmin corresponds for example to the shortest possible duration of the plateaus, that is to say, in particular when the machine is an engine, to the duration of the plateaus at the maximum operating speed of the engine. During a pressure peak and immediately after such a pressure peak, the value of T is therefore fixed at Tmin, so that the minimum duration taken into account for calculating the variation $\Delta S$ at the start of a plateau phase is equal to $\alpha$Tmin. This duration is subsequently increased progressively by the value $\alpha$ at each iteration.

Whatever the case, in the final step 40 the processing method delivers a value of the correction signal Corr for each sampling instant t, that is to say after each clock edge.

The mechanical ground MM may experience non-negligible variations with respect to the electronic ground ME, for example when the battery of the vehicle is delivering heavy currents (in particular when turning on the electrical starter of the engine). In order to overcome these variations and avoid their effect on the processing circuit, a voltage adder circuit 61, 64, 66, 67, 68, 69 is inserted into the capacitive feedback loop of the processing amplifier 12 in order to add there, on the second terminal 72 of said capacitor 29 opposite to the first terminal 71 of this capacitor 29 connected to the input 13 of the processing amplifier 12, an electrical voltage which varies as a function of the potential difference between the mechanical ground MM and the electronic ground ME, so that the variations of this potential difference are automatically and continuously compensated for at the input 13 of the processing amplifier 12 receiving the signal delivered by the piezoelectric detector.

To this end, the processing circuit firstly comprises an inverting circuit 51 to 57 providing a voltage with an opposite value −MM to the potential of the mechanical ground. This inverting circuit 51 to 57 comprises an inverting operational amplifier 51, the inverting input 52 of which is connected to the mechanical ground MM via a series resistor 53 with a value R1, and the noninverting input 54 of which is connected to the electronic ground ME. A feedback loop 57 connects the output 55 to the inverting input 52, via a series resistor with the same value R1. The output 55 therefore delivers a signal with a voltage −MM opposite to that of the mechanical ground MM with respect to the electronic ground ME. The operational amplifier 51 is supplied in bipolar fashion by +Vcc, −Vcc.

In the first embodiment of the invention, represented in FIG. 1, the voltage adder circuit of the capacitive feedback loop is produced in the following way. The capacitive feedback loop 16 of the processing amplifier 12 comprises an operational amplifier, referred to as an adder amplifier 51, supplied in bipolar fashion by +Vcc, −Vcc, receiving on its noninverting input 63 the signal S of the output 15 of the processing amplifier 12, via a series resistor 67 with a value R2, as well as the electronic ground ME via a series resistor 68 with the same value R2. The adder amplifier 61 receives on its inverting input 62 the voltage −MM delivered by the inverting circuit 51 to 57, which is opposite to that of the mechanical ground MM, via a series resistor 69 with the same value R2. The output 70 of the adder amplifier 61 forms a neutralization node 70 connected to the second terminal 72 of the capacitor 29 opposite to the first terminal 71 of this capacitor 29 connected to the input 13 of the processing amplifier 12. A feedback loop 64 connects the output 70 of the adder amplifier 61 to its inverting input 62 via a series resistor 66 with the same value R2. It will be understood that the potential at the neutralization node 70 is equal to S+MM. Thus, the variation of mechanical ground MM is compensated for simply and continuously in the capacitive loop 16 of the processing amplifier. This compensation is independent of the time constant of the capacitive feedback loop of the charge amplifier, so long as the voltage adder amplifier 61 is sufficiently fast with respect to this time constant.

Likewise, the resistive feedback loop 30 comprises an operational amplifier, referred to as an adder amplifier 81, supplied in bipolar fashion by +Vcc and −Vcc, receiving on its noninverting input 83 the compensation voltage signal Ucorr, as well as the electronic ground ME via a series resistor 88 with a value R3. The adder amplifier 81 receives on its inverting input 82 the voltage −MM delivered by the inverting circuit 51 to 57, which is opposite to that of the mechanical ground MM, via a series resistor 89 with the same value R3. The output 90 of the adder amplifier 81 forms a neutralization node 90 connected to the terminal 92 of the resistor 19 opposite to the terminal 91 of this resistor 19 connected to the input 13 of the processing amplifier 12. A feedback loop 84 connects the output 90 of the adder amplifier 81 to its inverting input 82 via a series resistor 86 with the same value R3. It will be understood that the potential at the neutralization node 90 is equal to Ucorr+MM. Thus, the variation of mechanical ground MM is also compensated for simply and continuously in the resistive feedback loop, the compensation current Icorr being at least substantially independent of the variations of the mechanical ground MM.

In the processing circuit of a sensor according to the invention, each operational amplifier is preferably supplied in bipolar fashion by the opposite voltages +Vcc, −Vcc. This is in particular the case at least for the processing amplifier 12. This is because it avoids any saturation of this amplifier when the mechanical ground MM varies. The same applies for the amplifiers 51, 61, 81 forming the voltage adders.

FIGS. 3a to 3c are examples showing the effect of the invention on a signal S delivered on the output 28 of a sensor according to the invention. FIG. 3a represents an example of a signal S when the mechanical ground MM is strictly at the same electrical potential as the electronic ground ME. FIG. 3b illustrates by way of comparison (not according to the invention) the variation of this signal S under the effect of a sinusoidal variation at 50 Hz injected into the mechanical ground MM, in the absence of the adder amplifiers 61 and 81 and the resistors which are associated with them. As can be seen, this variation is superimposed on the signal delivered by the piezoelectric detector. FIG. 3c illustrates the signal S delivered on the output 28 of the sensor according to the invention with injection of the same 50 Hz sinusoidal signal into the mechanical ground MM. As can be seen, the invention makes it possible to suppress the Hz variation almost entirely in the output signal S. This demonstrates that the ground faults are corrected automatically and continuously.

FIG. 4 represents another embodiment of a processing circuit according to the invention, which differs from the first embodiment on the one hand in that it has no compensation circuit, a resistor 99 being connected in parallel with the capacitor 29 (between the output node 70 of the voltage adder circuit and the input of the processing amplifier 12), in order to form a charge amplifier, and on the other hand in that the mechanical ground MM is injected on the noninverting input 63 of the adder amplifier 61 via the resistor 68, while the electronic ground ME is injected on the inverting input 62 of the adder amplifier 61 via the resistor 69. The inverting circuit 51-57 of the first embodiment is no longer needed. Here again, the potential at the neutralization node 70 is equal to S+MM. With such an arrangement, which is simpler in its design, it is nevertheless necessary for all the resistors 66, 67, 68, associated with the adder amplifier 61 to be perfect and identical.

A sensor according to the invention, comprising such a processing circuit as well as the piezoelectric detector, may be integrated inside the same mechanical assembly, in particular inside a diesel engine glow plug.

The invention may be the subject of numerous variants in relation to the embodiments represented in the figures and described above. In particular, the adder circuits for injecting the potential difference MM-ME into the feedback loops of the processing amplifier 12 may be the subject of other embodiments.

The invention claimed is:

1. A sensor comprising a piezoelectric detector (10) mounted in a support having electrically conductive walls forming a first electrical potential reference, referred to as mechanical ground (MM), to which the piezoelectric detector (10) is connected, and a circuit for processing the signal delivered by the piezoelectric detector, said processing circuit comprising:

an electrical supply circuit defining a second potential reference, referred to as electronic ground (ME), a charge amplifier comprising an operational amplifier, referred to as a processing amplifier (12), having:

an input (13) connected to an output (11) of the piezoelectric detector so as to receive the signal delivered by this output (11) of the piezoelectric detector (10), an output (15) delivering an output voltage signal referenced with respect to the electronic ground and representative of the signal delivered by the piezoelectric detector, a capacitive feedback loop (16) between the output (15) and the input (13) of the processing amplifier (12) receiving the signal delivered by the piezoelectric detector (10), said capacitive feedback loop (16) comprising a capacitor (29) of which a first terminal (71) is connected to said input (13) of the processing amplifier (12) receiving the signal delivered by the piezoelectric detector (10), wherein the capacitive feedback loop (16) comprises, between said output (15) of the processing amplifier (12) and said capacitor (29), a voltage adder circuit (61, 64, 66, 67, 68, 69) adapted to add on the second terminal (72) of said capacitor (29) an electrical voltage which varies as a function of the potential difference between the mechanical ground (MM) and the electronic ground (ME), so that the variations of this potential difference are continuously compensated for at the input (13) of the processing amplifier (12) receiving the signal delivered by the piezoelectric detector (10).

2. The sensor as claimed in claim 1, wherein said voltage adder circuit (61, 64, 66, 67, 68, 69) of the capacitive feedback loop (16) comprises a first input connected to the mechanical ground so as to have an electrical potential dependent on the mechanical ground, a second input connected to the electronic ground so as to have an electrical potential dependent on the electronic ground, and an output which is connected to the second terminal of said capacitor and whose electrical potential is dependent on the potential difference between its two inputs.

3. The sensor as claimed in claim 2, wherein one of the inputs of said voltage adder circuit (61, 64, 66, 67, 68, 69) of the capacitive feedback loop (16) is connected to the output of the processing amplifier so that the electrical potential on said input also depends on the value of the electrical potential of this output.

4. The sensor as claimed in claim 1, wherein the processing circuit furthermore comprises a resistive feedback loop (30) comprising a resistor, referred to as an injection resistor (19), a first terminal (91) of which is connected in parallel with said output (11) of the piezoelectric detector (10).

5. The sensor as claimed in claim 4, wherein the processing circuit comprises a compensation circuit (17) comprising an input connected to said output (15) of the processing amplifier (12), and an output (18) delivering a compensation voltage signal which is applied to the second terminal (92) of the injection resistor via a voltage adder circuit (81, 84, 86, 88, 89) separate from said voltage adder circuit (61, 64, 66, 67, 68, 69) of the capacitive feedback loop (16).

6. The sensor as claimed in claim 1, wherein said voltage adder circuit (61, 64, 66, 67, 68, 69) of the capacitive feedback loop (16) comprises an operational amplifier, referred to as an adder amplifier (61), having an inverting input (62) connected to a terminal having an opposite electrical potential (−MM) to the mechanical ground (MM), a noninverting input (63) connected to the electronic ground (ME) and to said output (15) of the processing amplifier (12), an output connected to said second terminal of the capacitor (29) of the capacitive feedback loop, and a negative feedback (66) between the inverting input (62) and the output (70) of this adder amplifier (61).

7. The sensor as claimed in claim 6, wherein the output (15) of the processing amplifier (12) is connected to the noninverting input (63) of the adder amplifier (61) via a series resistor (67), wherein the electronic ground (ME) is connected to this noninverting input (63) of the adder amplifier (61) via a series resistor (68) with the same value, wherein said terminal (55) at the opposite electrical potential (−MM) to the mechanical ground (MM) is connected to the inverting input (62) of the adder amplifier (61) via a series resistor (69) with the same value, and wherein the negative feedback (64) of the adder amplifier (61) contains a series resistor (66) with the same value.

8. The sensor as claimed in claim 1, wherein said processing amplifier (12) is supplied in bipolar fashion by supply voltages +Vcc, −Vcc which have opposite values with respect to the electronic ground (ME) and are selected so as to permit the variations of the potential of the mechanical ground (MM) with respect to that of the electronic ground (ME).

9. The sensor as claimed in claim 1, wherein each operational amplifier of the processing circuit is supplied in bipolar fashion by supply voltages +Vcc, −Vcc which have opposite values with respect to the electronic ground (ME) and are selected so as to permit the variations of the potential of the mechanical ground (MM) with respect to that of the electronic ground (ME).

10. The sensor as claimed in claim 2, wherein the processing circuit furthermore comprises a resistive feedback loop (30) comprising a resistor, referred to as an injection resistor (19), a first terminal (91) of which is connected in parallel with said output (11) of the piezoelectric detector (10).

11. The sensor as claimed in claim 2, wherein said voltage adder circuit (61, 64, 66, 67, 68, 69) of the capacitive feedback loop (16) comprises an operational amplifier, referred to as an adder amplifier (61), having
an inverting input (62) connected to a terminal having an opposite electrical potential (−MM) to the mechanical ground (MM),
a noninverting input (63) connected to the electronic ground (ME) and to said output (15) of the processing amplifier (12),
an output connected to said second terminal of the capacitor (29) of the capacitive feedback loop,
and a negative feedback (66) between the inverting input (62) and the output (70) of this adder amplifier (61).

12. The sensor as claimed in claim 2, wherein said processing amplifier (12) is supplied in bipolar fashion by supply voltages +Vcc, −Vcc which have opposite values with respect to the electronic ground (ME) and are selected so as to permit the variations of the potential of the mechanical ground (MM) with respect to that of the electronic ground (ME).

13. The sensor as claimed in claim 2, wherein each operational amplifier of the processing circuit is supplied in bipolar fashion by supply voltages +Vcc, −Vcc which have opposite values with respect to the electronic ground (ME) and are selected so as to permit the variations of the potential of the mechanical ground (MM) with respect to that of the electronic ground (ME).

14. The sensor as claimed in claim 3, wherein the processing circuit furthermore comprises a resistive feedback loop (30) comprising a resistor, referred to as an injection resistor (19), a first terminal (91) of which is connected in parallel with said output (11) of the piezoelectric detector (10).

15. The sensor as claimed in claim 14, wherein the processing circuit comprises a compensation circuit (17) comprising an input connected to said output (15) of the processing amplifier (12), and an output (18) delivering a compensation voltage signal which is applied to the second terminal (92) of the injection resistor via a voltage adder circuit (81, 84, 86, 88, 89) separate from said voltage adder circuit (61, 64, 66, 67, 68, 69) of the capacitive feedback loop (16).

* * * * *